United States Patent [19]

Sticht

[11] Patent Number: 5,103,964
[45] Date of Patent: Apr. 14, 1992

[54] HOUSING PART FOR A WORK STATION OF AN ASSEMBLY LINE

[76] Inventor: Walter Sticht, Karl-Heinrich-Waggerl-Str. 8, A-4800 Attnang-Puchheim, Austria

[21] Appl. No.: 490,489

[22] Filed: Mar. 8, 1990

[30] Foreign Application Priority Data

Mar. 8, 1989 [AT] Austria .................................. 531/89

[51] Int. Cl.⁵ .............................................. B65G 25/00
[52] U.S. Cl. .................................. 198/465.2; 29/33 P; 198/465.1
[58] Field of Search ............... 198/465.1, 465.2, 465.3, 198/861.1; 29/33 P

[56] References Cited

U.S. PATENT DOCUMENTS

| | | | |
|---|---|---|---|
| 2,903,120 | 9/1959 | Thomas | 198/465.2 X |
| 3,729,083 | 4/1973 | Wollenhaupt et al. | 198/465.1 |
| 4,172,512 | 1/1979 | Llegg et al. | 29/33 P X |
| 4,181,211 | 1/1980 | Nishimura et al. | |
| 4,291,797 | 9/1981 | Ewertowski | 29/33 P X |
| 4,475,642 | 10/1984 | Flitz | 198/465.1 X |
| 4,492,297 | 1/1985 | Sticht | |
| 4,515,264 | 5/1985 | Sticht | 198/465.2 X |
| 4,530,287 | 7/1985 | Sticht | |
| 4,619,205 | 10/1986 | Sticht | |
| 4,681,043 | 7/1987 | Sticht | |
| 4,687,091 | 8/1987 | Sticht | |
| 4,712,484 | 12/1987 | Sticht | |
| 4,783,904 | 11/1988 | Kimura | 198/465.2 X |
| 4,924,777 | 5/1990 | Linton et al. | 198/465.1 X |
| 4,938,095 | 7/1990 | Sticht | |

FOREIGN PATENT DOCUMENTS

| | | | |
|---|---|---|---|
| 2106595 | 10/1972 | Fed. Rep. of Germany . | |
| 2518689 | 11/1976 | Fed. Rep. of Germany | 198/465.2 |
| 2640593 | 6/1977 | Fed. Rep. of Germany . | |
| 2756422 | 6/1979 | Fed. Rep. of Germany | 198/465.3 |
| 3134195 | 10/1983 | Fed. Rep. of Germany . | |
| 3407785 | 2/1985 | Fed. Rep. of Germany . | |
| 2118127 | 10/1983 | United Kingdom | 198/465.2 |

Primary Examiner—Robert P. Olszewski
Assistant Examiner—James R. Bidwell
Attorney, Agent, or Firm—Collard, Roe & Galgano

[57] ABSTRACT

An installation for processing or assembling components, which comprises a succession of transport and work stations. Each station comprises a housing member including a lower base frame and an upper base frame, at least one of the housing members supporting a straight conveying track for a workpiece carrier carrying the components and at least one of the housing members supporting intersecting conveying tracks for the workpiece carrier, the conveying tracks including vertical and lateral guides for the workpiece carrier. According to the invention, the housing members have the same dimensions in length and width, and the width of each housing member is shorter than the length, the housing member base frames having vertical side walls extending along the length and the width, a continuous fixing rail extending along the vertical side walls of the lower base frame, fixing rails extending along the entire length of the vertical side walls of the upper base frame extending along the width, and fixing rail sections extending towards each other along about a third of the length of the vertical side walls of the upper base frame extending along the length, and a forward feed for conveying the workpiece carrier along the tracks.

16 Claims, 12 Drawing Sheets

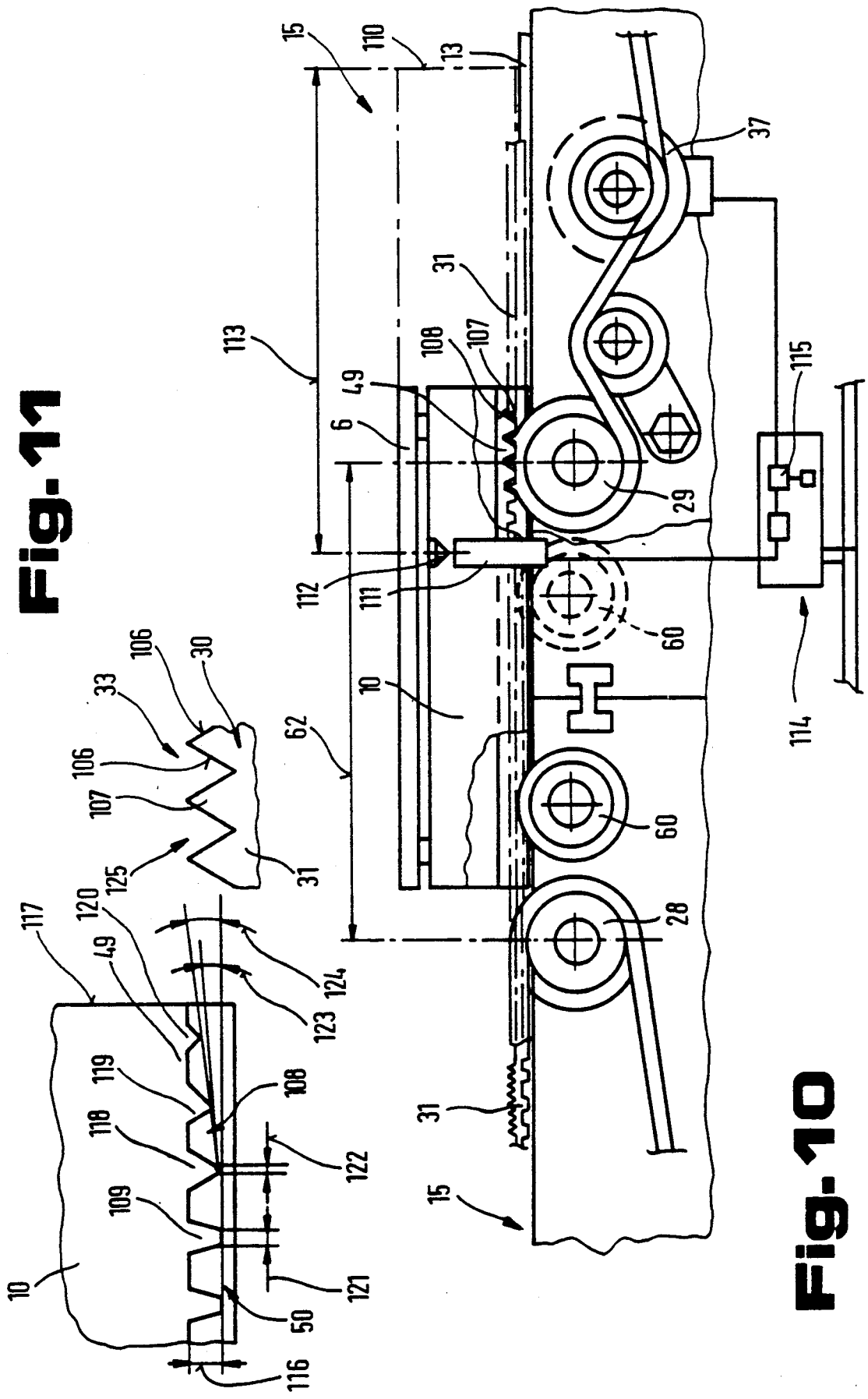

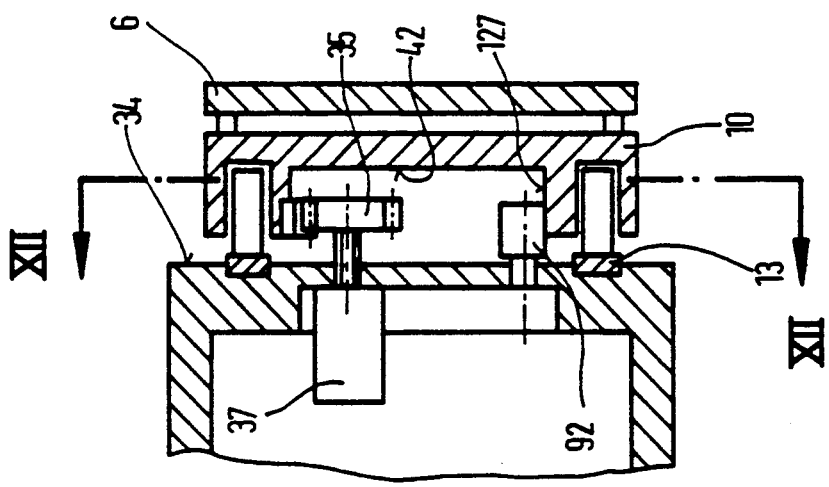
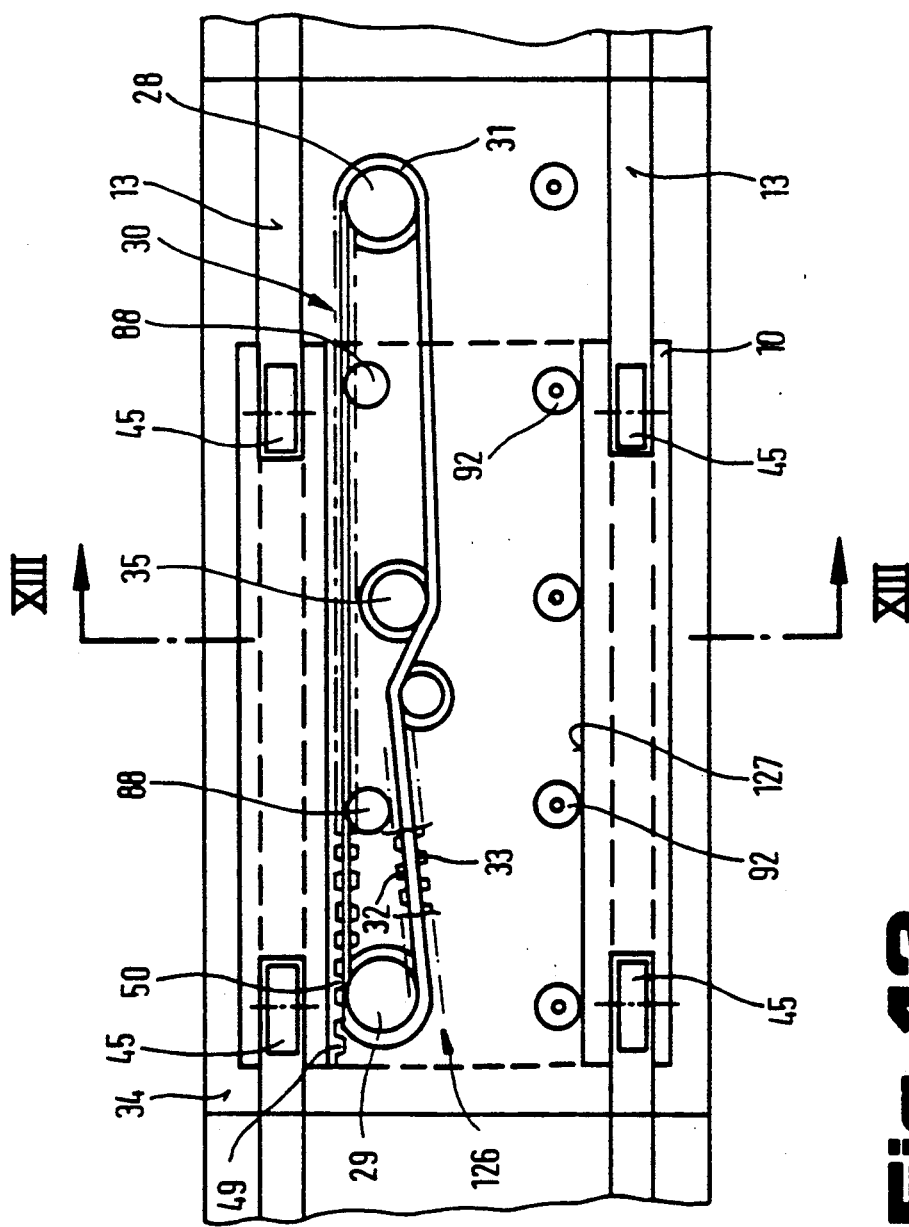

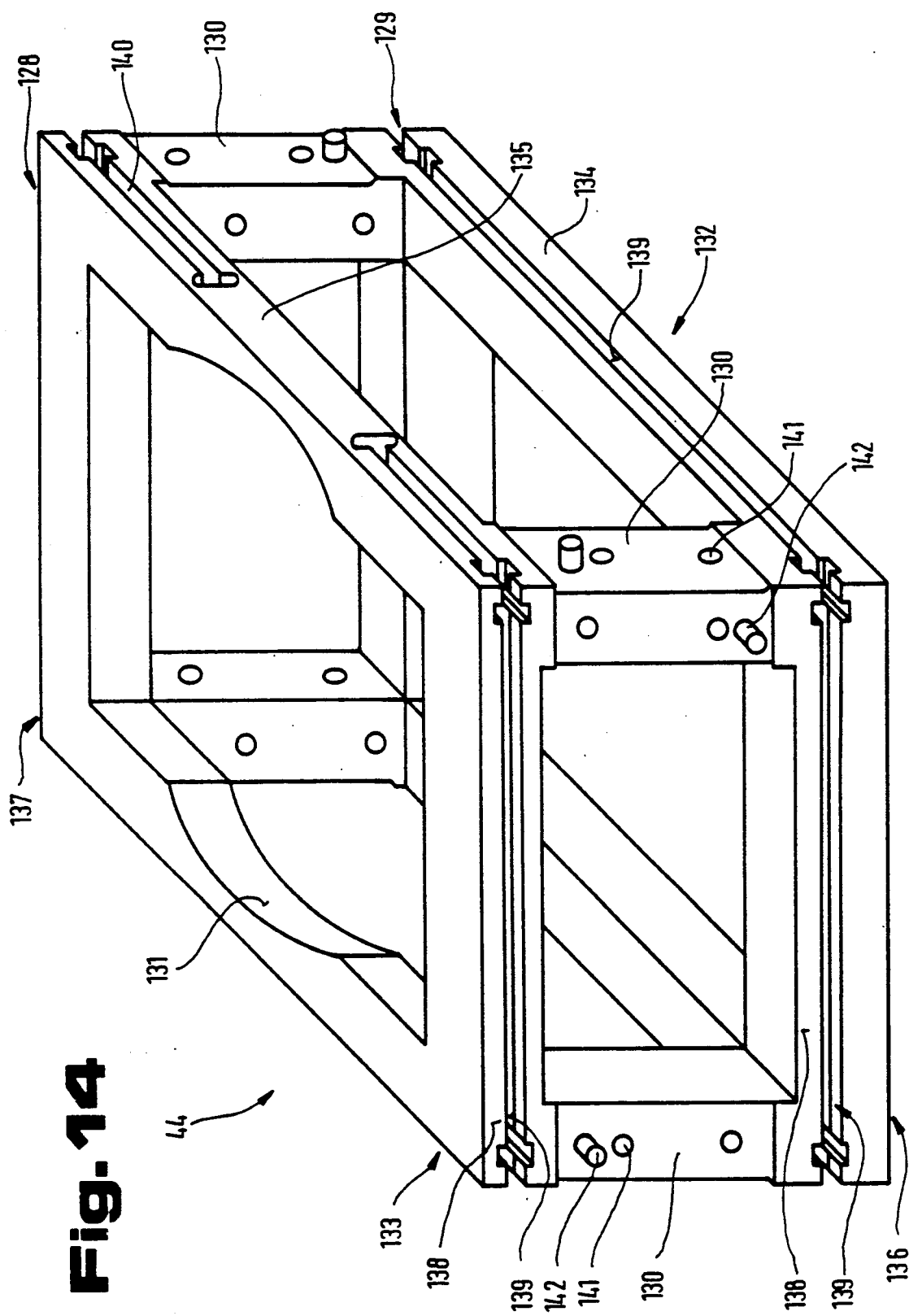

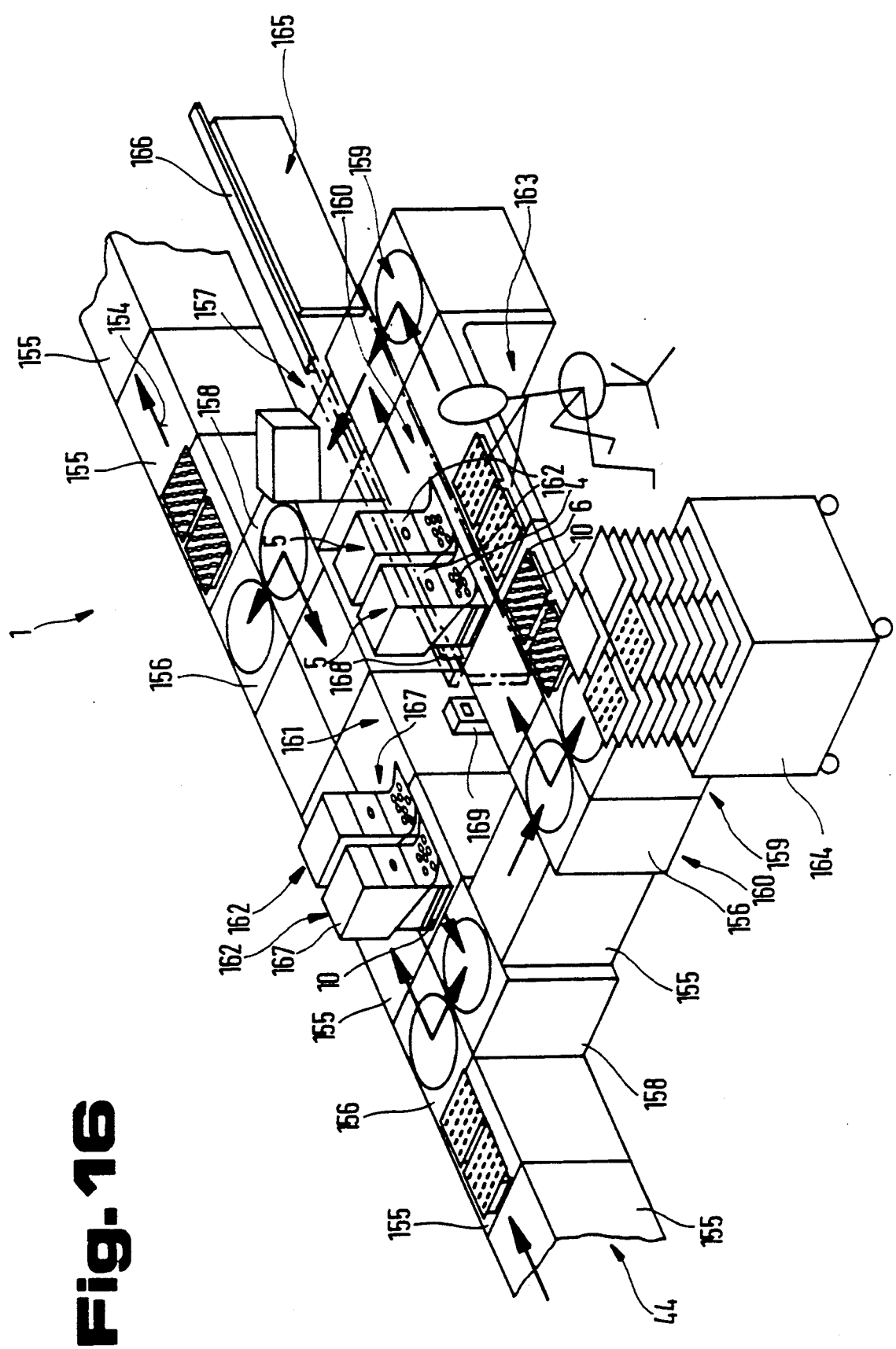

HOUSING PART FOR A WORK STATION OF AN ASSEMBLY LINE

The invention relates to an installation for processing and/or assembling components, comprising a vertical guide means, a lateral guide means and a separate forward feed means for workpiece carriers containing the components.

In installations of this type a basic distinction can be made between so-called loosely concatenated and rigidly concatenated installations. In the loosely concatenated ones, the workpiece carriers or their running gears are moved along the installation quite independently of one another. If an apparatus in one workstation fails, the operation in the other workstations is hardly affected for a certain time. In rigidly concatenated installations the workpiece carriers are interconnected in their movement. If there is trouble in the vicinity of one workstation, all the workpiece carriers and all the workstations will therefore be blocked. Each type has its special field of application. The rigidly concatenated installations are used where only a few work stations are concatenated, since the total utilisation rate is a product of the utilisation rates of the individual workstations. Loosely concatenated installations are usually employed to concatenate a plurality of workstations, e.g. up to 40 and more, since the utilisation rate is then a value compounded from the individual occurrences of trouble, rather than the product of the utilisation rates in the individual stations.

Many different installations with loose concatenation are already known—e.g. in accordance with Applicants' U.S. Pat. Nos. 4,681,043, 4,938,095, 4,619,205, 4,530,287 and 4,492,297—and have proved successful in practice for concatenating a plurality of workstations. The workpiece carriers are guided along vertical and lateral guideways independently of one another, and appropriate use of conveying rollers pressed against the side surfaces of the workpiece carriers ensures lateral and vertical guidance of the carriers without any play. Thus accurate positioning of the workpiece carriers is achieved throughout an installation of this type, in conjunction with the drive means.

Rigidly connected installations, where the individual workpiece carriers are linked by conveying chains, are also known, from DE OS 26 40 593. It has no far been difficult to mass produce such installations or adapt them to different requirements with different numbers of workstations. It was also difficult to install the conveying chain on the assembly or processing means located in the workstations.

The other known rigidly concatenated installations for processing and assembling components are formed by turntables, which may in appropriate cases be interlinked by additional transporting means, e.g. as in DE OS 31 34 195. Rigidly concatenated installations such as turntables cannot subsequently be extended by adding workstations; they also have a large space requirement, particularly if a plurality of workstations are arranged one behind the other. Access, erection and servicing are very difficult, due to the compact arrangement of the assembly and handling or processing means inside the turntable.

Manufacturing systems with a plurality of aligned machine tables are also known, from DE OS 21 06 595. They each form sections of transporting track and can be coupled together to form an integrated manufacturing system, in a sequence corresponding to the given manufacturing programme, using coupling members of identical structure. The tables provided for this system are made by frame construction and are sturdy, so that they can absorb the many different stresses. The sturdy construction makes them heavy, and the tables are very bulky for transportation.

A machine table of modular construction for manufacturing equipment is also already known, from U.S. Pat. No. 4,681,043, is made up of a plurality of solid components and forms a firm, stable and easily interconnected machine table for various types of workstations, such as transport or direction changing stations. Tables are often too expensive or too bulky for simple installations with less high demands and longer cycles and for use in conjunction with manual workstations.

The problem underlying the invention is therefore to provide a housing member for a work or processing station or a manual work position in a loosely concatenated system. It must take up little space and must optionally be usable in many different applications.

The invention solves this problem by providing housing members for straight and intersecting conveying tracks, the housing members having the same dimensions in length and in width, and the width is shorter than the length. The surprising advantage of this solution is that Applicants a single housing member is used to support forward feed means for straight feed of the workpiece carriers in the workstations and for diverting the carriages from one conveying direction to another enables. So parallel conveying paths can now be accommodated with minimum spacing, so that e.g. two workpiece carriers in parallel conveying paths are within the operator's reach and thus within his working area.

It is advantageous for the housing member to have two rectangular base frames, interconnected in the corner regions by columns extending perpendicularly thereto. This simple construction of the housing member enables it to be made advantageously from cast iron. Great accuracy is thereby achieved, and the amount of machining required for the housing members can be reduced.

It is possible for the lower base frame to have a continuous fixing rail in the region of its vertical side walls, and for the upper base frame to have a continuous fixing rail in the region of its broad side edges, and fixing rail sections, extending towards one another over about one-third of the length from the broad side edges, in the region of its longitudinal edges. This minimises the amount of machining of the base frames. In addition, not only can additional devices such as supply means, handling equipment or the like be fixed by means of these processing surfaces; the fixing rails and their associated guide surfaces may also be used to hold the housing members a desired distance away from a supporting surface, e.g. a bed or the like, with supporting constructions made e.g. of aluminium sections or the like, It is further possible for a table slab to be placed on the upper rectangular base frame, for straight vertical guides, e.g. hardened and ground steel guide rails, to be arranged on the slab, and for recesses or apertures for receiving the forward feed means to be provided in the slab. With different forms of the table slab, the housing members can thereby be put to different applications rapidly, e.g. in the region of manual work positions or automatic stations.

It is a further advantageous for two or more housing members, arranged with their side walls immediately adjacent one another, to form a continuous track for the workpiece carriers, since a conveying track of any length can be provided by aligning housing members.

In another embodiment at least two parallel rows of a plurality of housing members arranged with their side walls immediately adjacent one another, are arranged with their longitudinal walls immediately adjacent one another. In this way to conveying tracks for carriages and workpiece carriers can be very closely juxtaposed. This particularly enables an operator, seated in front of the longitudinal wall, to have the longitudinal guideways associated with the two immediately adjacent rows of housing members within his reach.

Another possibility is for the table slab to contain a slot-like recess extending parallel with the vertical guideways and located between the two guideways, preferably nearer to one of them. This makes it possible to use the housing members in the region of manual work positions, owing to the recessed arrangement of the forward feed means in the table slab. In addition there is still room to provide access to the carriage and transporting pallets or workpiece carriers from the side of the housing member, in the region of a workstation.

It is also possible for the forward feed means to be arranged on a supporting plate, for the supporting plate to be fixed on the table slab, and for a belt-like drive element, e.g. an endless toothed belt, to project a predetermined distance above the table slab. In this way, a standard forward feed means may be used, and lateral guide rollers are advantageously provided in alignment with the forward feed means and with lateral guide elements before and after it, and are rotatable particularly about shafts level with the table slab, since this permits satisfactory accurate lateral guidance even when the spacing in the conveying direction substantially corresponds to a length of the running gear.

The table slab may contain a circular recess and have a supporting frame extending through the housing member in the opposite direction to the table slab, and a pulley may be mounted in the supporting frame by means of the holder for rotation about a shaft normal to the table slab, since this enables the running gear to be turned and put onto angular conveying paths.

In another embodiment the pulley has an elongated recess, in which an upper run of a belt-like drive element extends through and projects beyond the table slab. With this arrangement the forward feed means provided for the transport stations may also be used to advance the running gears in the region of the pulley.

It is advantageous for straight vertical guides forming the vertical guideways, e.g. hardened and ground steel guide rails, to be arranged parallel with the elongated recess, for vertical guideways sections to be associated with the guides in different angular positions, with the same spacing transversely to the conveying direction and for the vertical guideway sections preferably to be arranged parallel with a longitudinal wall of the housing members and normal thereto, each one extending from the broad side walls or the longitudinal walls to the end edge of the table slab associated with the pulley. By these means the running gears and workpiece carriers can be guided very accurately and without any jolting or shaking, even when they are being transferred to different conveying paths.

In another embodiment the end portion of the holder remote from the pulley is connected to a toothed ring, which preferably moves around and is parallel with the pulley, and the toothed ring engages in the drive element of a forward feed means, arranged normal to the forward feed means located in the pulley but constructed in the same way as those means. This enables the standard forward feed means to be used for turning the pulley.

In another modification the holder is mounted for rotation about the shaft extending perpendicularly to the table slab, by means of a bearing device in the supporting frame, and the gear wheel is located on a part of the holder projecting over the supporting frame in the direction away from the pulley. This facilitates access to the forward feed means and enables them to be exchanged rapidly if there is a fault in the drive.

The housing member and/or the supporting frame and/or the holder is advantageously formed by a cast iron member, since this enables the production costs and strength properties to be brought into an economic relationship. This is possible, particularly because the housing members can be used for both the transport stations and the nodal stations, so the total number is considerably higher than it would be in installations with separate transport and nodal stations.

The carriages with the components to be mounted may advantageously be arranged on the longitudinal guideways nearest to an operator, e.g. a parallel conveyor, and the longitudinal guideway on and immediately adjacent to the longitudinal wall remote from the operator, e.g. an adjacent conveying path, may support carriages with grab containers and working and/or processing tool arranged on them. Owing to the small depth of two immediately adjacent rows of such housing members, it is a simple matter for the operator to be supplied with the parts required for assembly, in the appropriate number and form, along a second guideway, arranged at the opposite side of the guideway along which the workpiece carriers with the components to be processed or assembled are brought past. This is a surprisingly simple way of providing the prerequisites for manufacturing small series of products with parts which only vary from one another in having a different design, e.g. a different colour, without any risk of producing faulty goods. The parts no longer required can be removed with the carriages and taken to a storage area, within an extremely short time and without any manual action by the operator, while the carriage carrying the grab containers with the parts required for the components to be assembled can be positioned in the manual work area.

It is consequently now also possible to exchange empty grab containers and pallets rapidly, so that the flow of work is not interrupted or is only slightly interrupted by replenishment of parts.

To give a better understanding of the invention it will now be explained in greater detail, with reference to examples, which are illustrated in the accompanying drawing. In the drawings:

FIG. 10 is a side view of the part of the forward feed means with a workpiece carrier running into it;

FIG. 11 is a side view of part of the toothed rail of the running gear of FIG. 10;

FIG. 12 is a plan view, and a section taken along XII—XII in FIG. 13 in a simplified diagramatic representation, showing a different embodiment of a forward feed means for a track section with an endless toothed belt running in a horizontal plane;

FIG. 13 is an end view of the forward feed means in FIG. 12, in a section taken along lines XIII—XIII in FIG. 12;

FIG. 14 is a simplified diagramatic representation of a housing member for a working or processing station;

FIG. 16 shows part of a manufacturing installation, made up of workstations using the housing members according to the invention.

Figure 1:
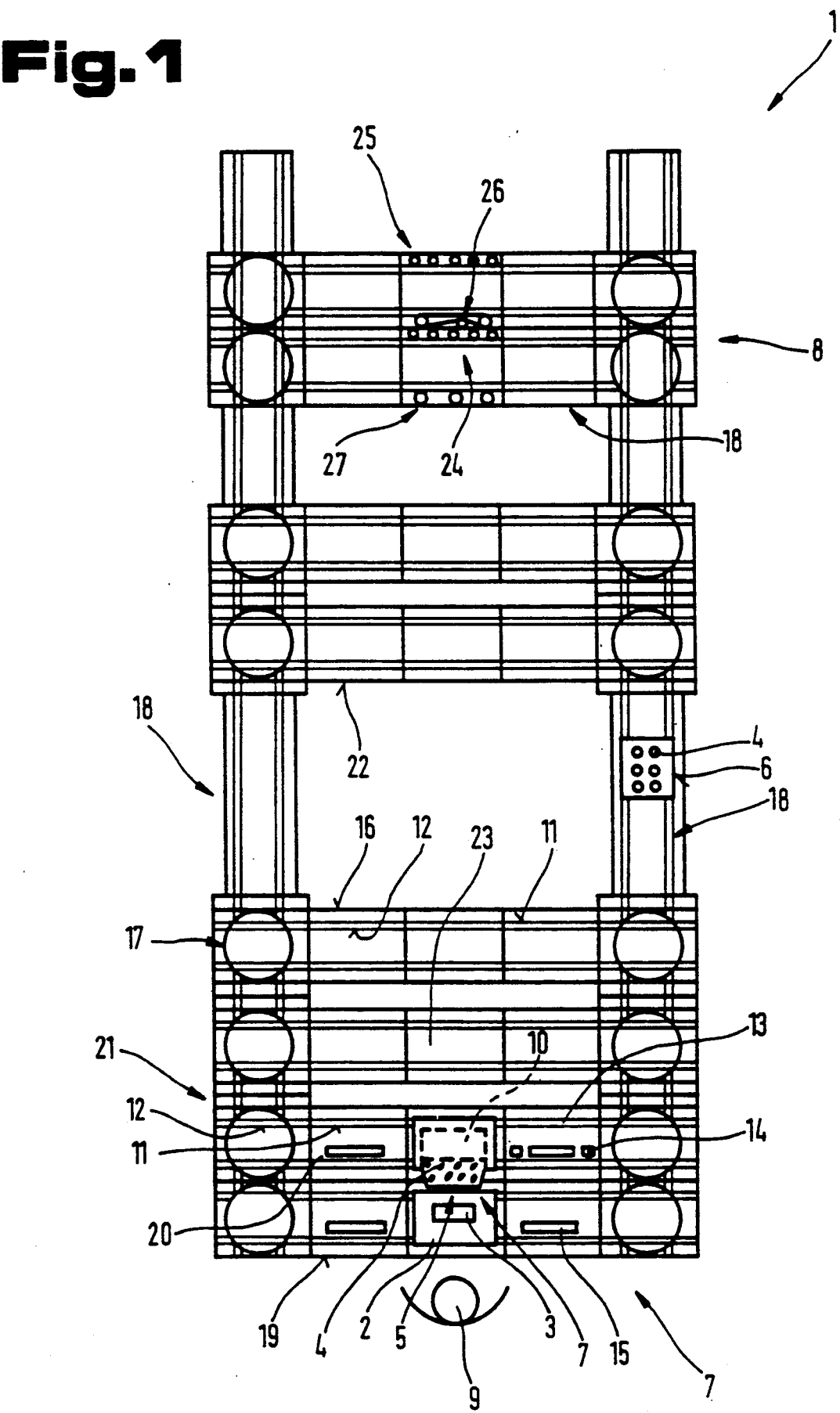
FIG. 1 is a plan view of a manufacturing installation, in a simplified diagrammatic representation; the installation is made up of a plurality of track sections in rectangular form, with forward feed means of different constructions according to the invention.

Referring to FIG. 1, this shows a manufacturing installation 1 used for processing or assembling components 3 arranged on carriages 2. The components 3 are built up from a plurality of parts 4, held ready for assembling in containers 5 or pallet inserts 6. Such an installation may comprise a workstation 7 and a workstation 8. The handling, assembly and processing jobs are done by an operator 9 at workstation 7, while workstation 8 is a fully automatic assembling or processing station. The carriages 2 and containers 5 or pallet inserts 6 are moved by preferably identical carriages 10 from workstation 7 to workstation 8 independently of one another, i.e. by so-called loose concatenation, by forward feed means 15 along vertical and lateral guide ways 13 and 14 formed by individual track sections 11, 12.

The individual track sections 11, 12 are arranged on transport stations 16 or nodal stations 17. These can equally be described as transport or nodal modules, since they advantageous have the same dimensions and can be coupled together in any positions. The main conveying paths 18 and parallel conveying paths 19 or adjacent conveying paths 20, required to build up such an installation 1, may be formed by any combination of transport stations 16 and/or nodal stations 17. Transverse conveying paths 21 may be provided to link the main, parallel and adjacent conveying paths 18; 19; 20. In addition return conveying paths 22 and storage conveying paths 23 may be provided, to enable the same running gears 2 to pass an operator 9 several times along a main conveying path 18 and/or parallel conveying path 19.

Differently constructed forward feed means 15 and 26 or 27 respectively may be provided for the transport or nodal stations 16 and 17 and for the transport stations 24, 25 in the region of the workstation 8.

Figure 2:
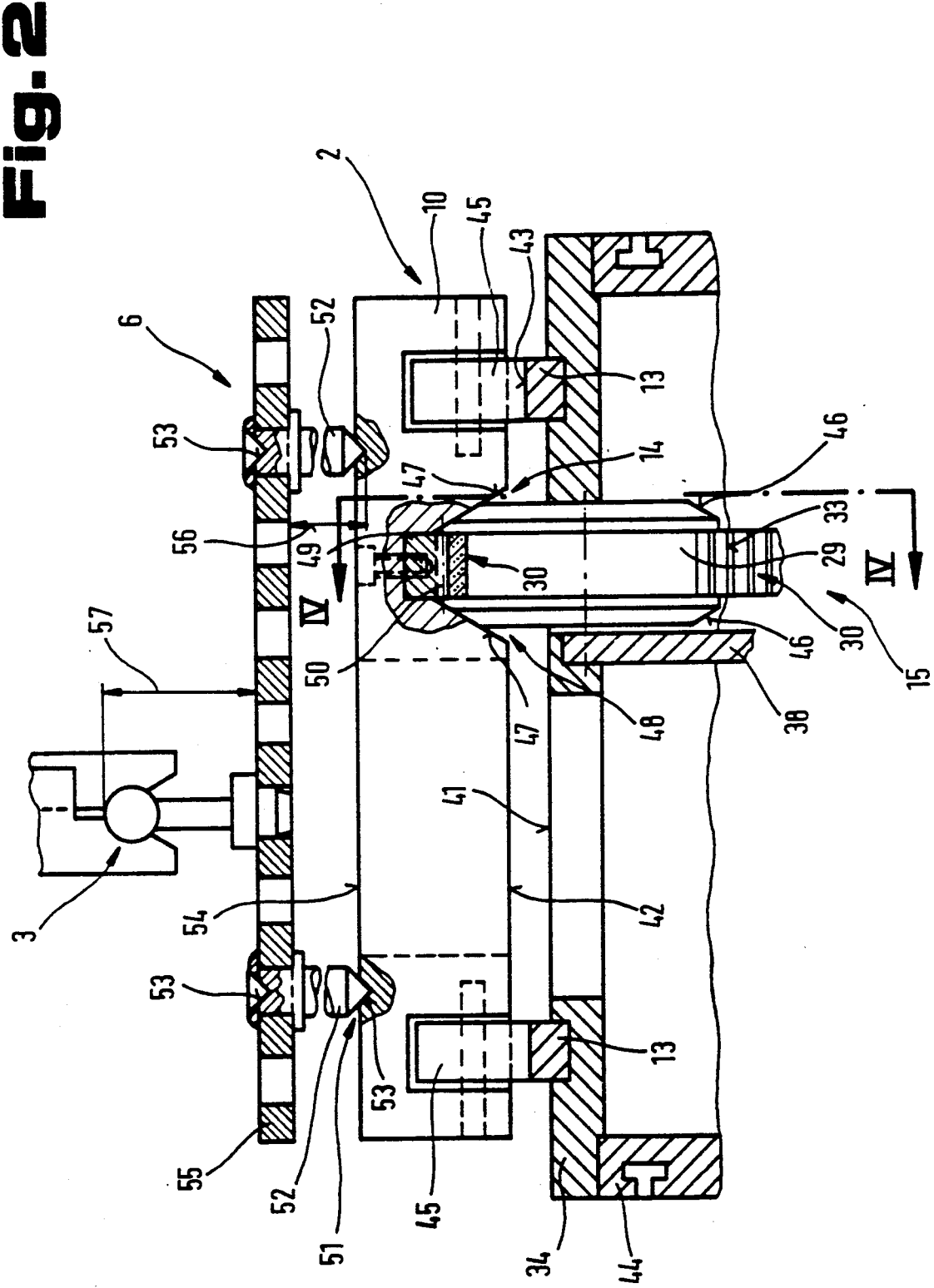
FIG. 2 is an end view, in a section taken along lines II—II in FIG. 4, showing a section of carriageway with a forward feed means arranged between the vertical guide.
Figure 3:
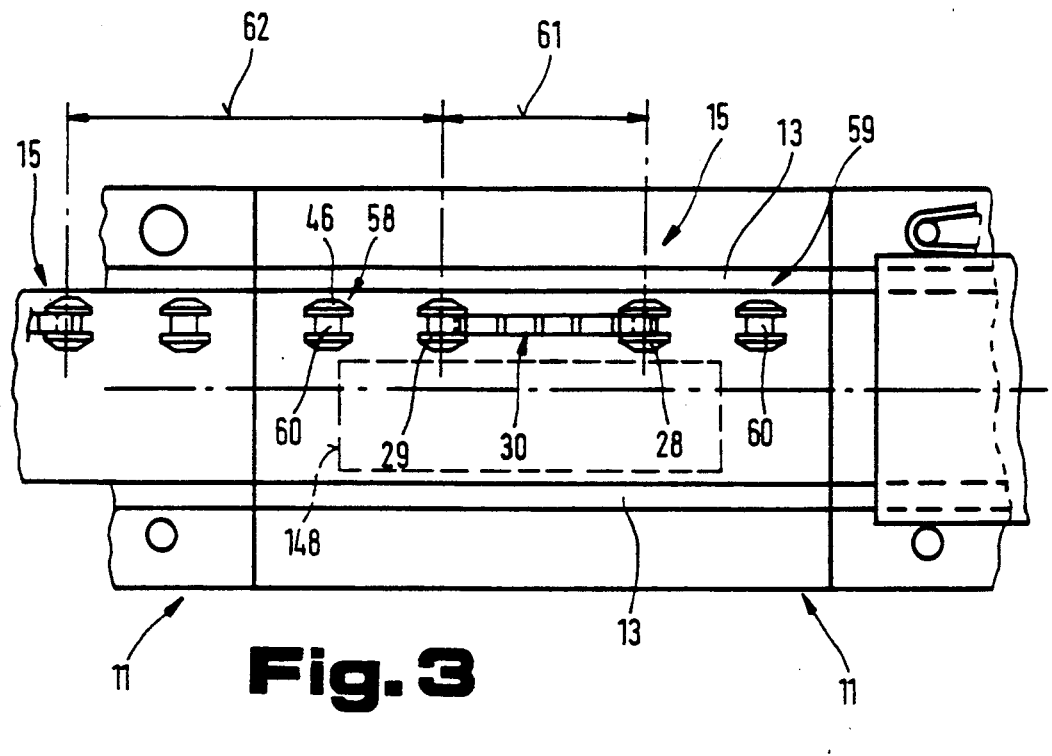
FIG. 3 is a plan view of the track section in FIG. 2.
Figure 4:
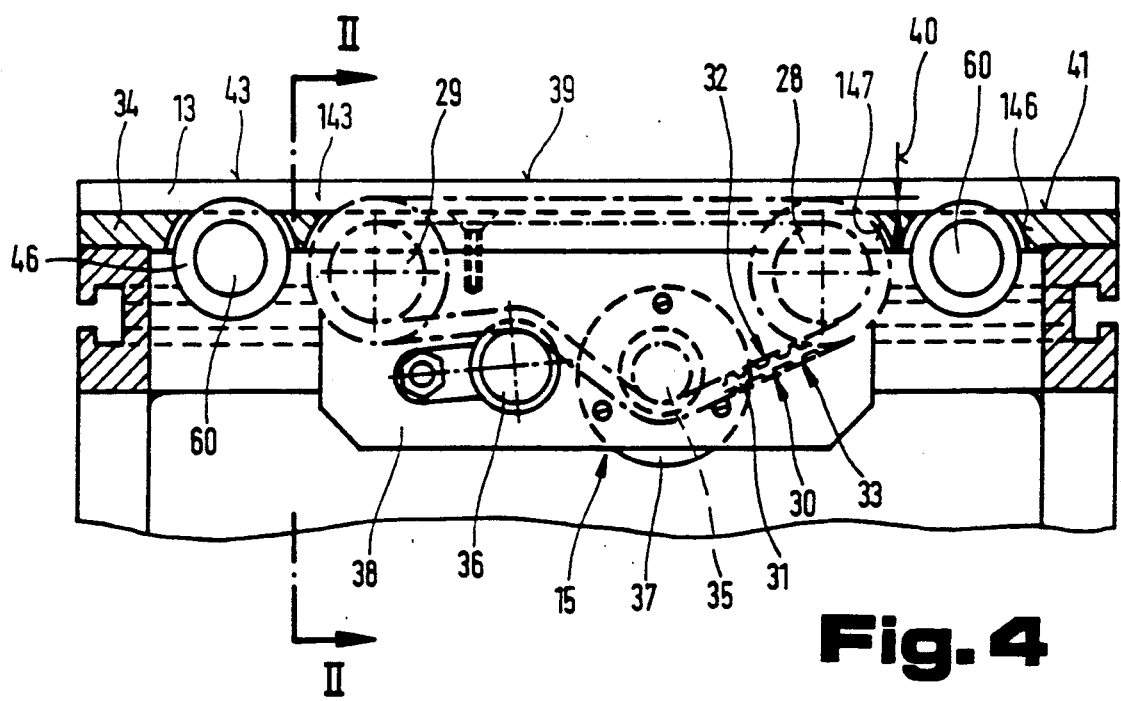
FIG. 4 is a side view, in a section taken along lines IV—IV in FIG. 2, showing the track section in FIG. 2 and 3.

FIGS. 2 to 4 show a forward feed means 15 comprising an endless belt-like drive element 30 trained over pulleys 28, 29. The element 30 is a toothed belt 31, with both toothing 32 on the side facing towards the pulleys 28, 29 and toothing 33 on the side facing away from them.

The toothed belt 31 is guided between the two direction changing rollers 28, 29, at the said remote from a table slab 34 by a driven pinion 35 and a tension roller 36. The pinion 35 is connected to a drive shaft of a drive motor 37 for joint rotation. The motor 37, pulleys 28, 29 and tension roller 36 are arranged on a supporting plate 38. The plate 38 is fixed in such a way that a top 39 of the drive element 30 projects only a short distance 40 beyond the surface 41 of the table slab 34. The short distance 40 is preferably larger than the average thickness of a human finger. This is to prevent an operator's fingers from being caught between the surface 41 of the table slab 34 and an underside 42 of the carriage 10 facing towards it. For this reason it is also advantageous for the distance between a surface 43 of the steel rails of the vertical guide 13, which may be inserted in the table slab 34, and the surface 41 of the table slab 34 not to exceed the distance 40.

It will further be seen from FIG. 2 that the table slab 34 is fixed to a housing member 44. The carriage 10 is supported on the vertical guideways 13 by guide rollers 45. A lateral guideway 14 for the carriage 10 is formed by lateral guide surfaces 46 of the pulleys 28, 29. The guides surfaces 46, together with the lateral guide surfaces 47 in the underside 42 of the carriage 10, form a guide passage 48 of substantially trapezoidal cross-section, which is open at the end towards the underside 42. A rack 49 is inserted in the region of the upper part of the guide channel 48, parallel with the underside 42, with its toothing 50 facing towards the drive element 30.

The construction of the lateral guide surfaces 46 and pulleys 28, 29 and the arrangement of the rack 49 in the guide passage 48 enables the rack 49 to be centered on the drive element 30 simultaneously with the lateral guidance of the carriage 10. This also ensures that the toothing 33 on the belt 31 engages securely and centrally in the toothing 50 on the rack 49.

FIG. 2 additionally shows how the pellet insert 6 is placed on the carriage 10 and supported on the gear 10 by a coupling means 51. In the simplest case the coupling means 51 comprises centering pins 52 with tapered ends. The tapered ends of the pins 52 are inserted in diametrically opposed tapered seats 53 arranged in a surface 54 of the running gear 10. The dead weight of the pallet insert 6 holds it exactly in position with the carriage 10. The centering pin 52 carries a supporting plate 55 of the pallet insert 6; as shown diagramatically, it has a tapered seat 53 at the end remote from the tapered tip. The seats 53 enable a plurality of pallet inserts 6 to be stacked one above the other in a central position.

If in addition the length 56 of the centering pins 52 is at least slightly larger than a length 57 measured normal to the supporting plate 55, the individual plate inserts 6 can be stacked directly one above the other without any additional aids or guide members.

As will be seen better in FIG. 3, lateral guide members 58, 59 precede and follow belt drive 30 in the longitudinal direction of the vertical guideways 13, along a section of track 11 or 12. The members 58, 59 are formed by rollers 60 which may be rotatably mounted directly in the table slab 34. They may however have a smaller periphery than the pulleys 28, 29. But in any case they have lateral guide surfaces 46 corresponding to surfaces 46 of the rollers 28, 29; consequently the carriage 2 or the running gear 10 is also guided laterally by the members 58, 59, in its movement along the vertical guideways 13, i.e. so long as the guide passage 48 has not yet reached the pulleys 28, 29. This reliably prevents any undesirable strong lateral deflections of the running gears 10 during their forward movement along the vertical guideway 13.

The provision of the additional lateral guide members 58, 59 also makes it possible to minimise the length 61 of the forward feed means 15. One can therefore avoid inaccuracies resulting from different expansion of the belt-like drive member and oscillations resulting from the large gripping length between the pulleys 28 and 29. The length 61 of the forward feed means 15 should nevertheless be chosen so that a distance 62 between the successive forward feed means 15 of two carriageway sections 11, arranged one behind the other longitudinally of the vertical guideway 13, is shorter than the length of the rack 49 on the carriage 10. This ensures that the carriages 10 can be fed forwards without welds, over the adjoining track sections 11 and 12. Another advantage of this arrangement is that the same forward freed means 15 may be used on the track sections 12 in the region of the nodal stations 17 as in the region of the transport stations 16.

Continuous lateral guidance of the carriages 10 in the transitional region between adjoining carriageways sections 11 of transport stations 16 is provided by the lateral guide members.

Figure 5:
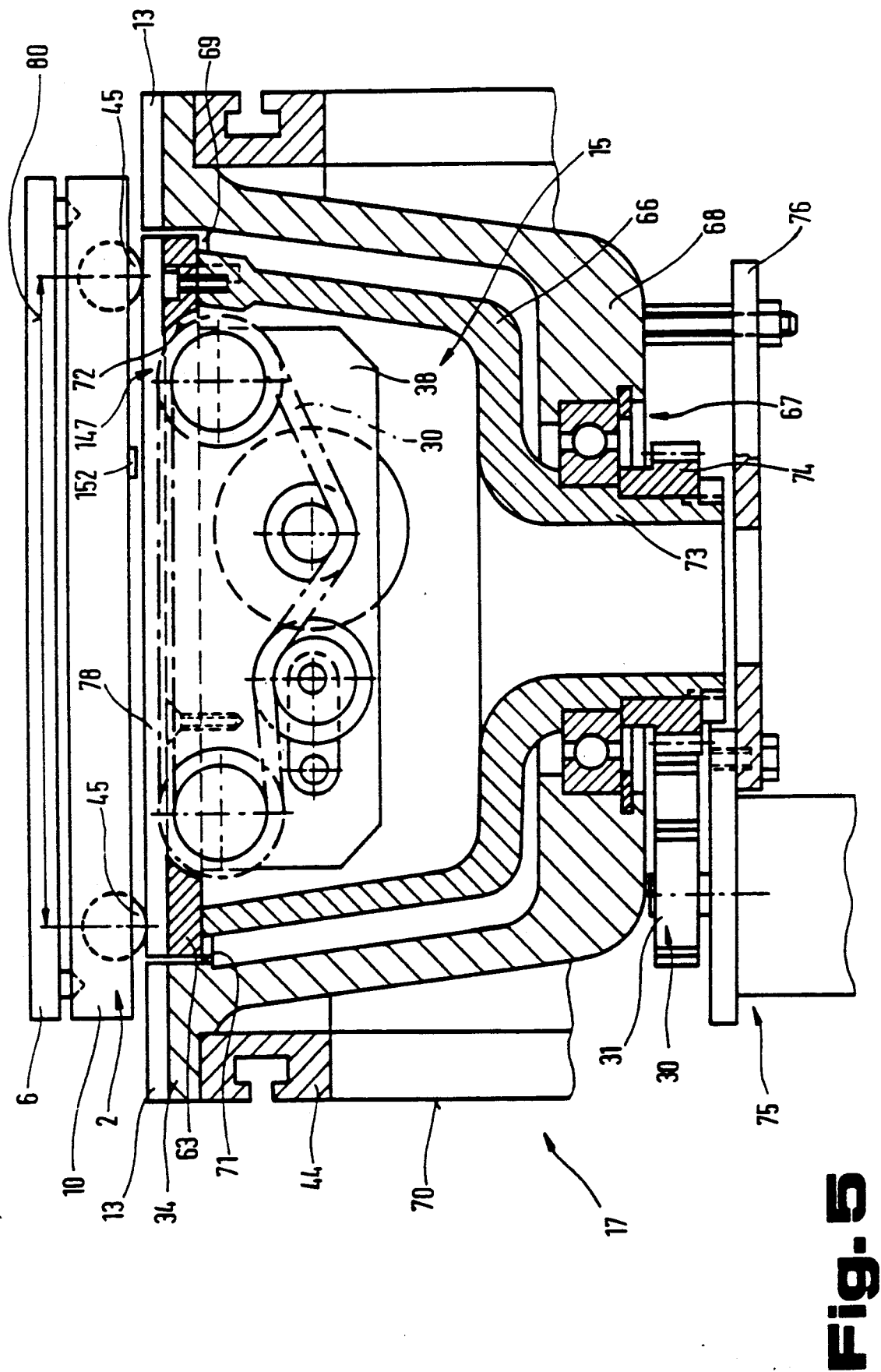
FIG. 5 is a side view, in a section taken along liens V—V in FIG. 6 and with simplified diagrammatic representation, showing a different embodiment of a lateral guide, in conjunction with a forward feed means arranged between the vertical guides.
Figure 6:
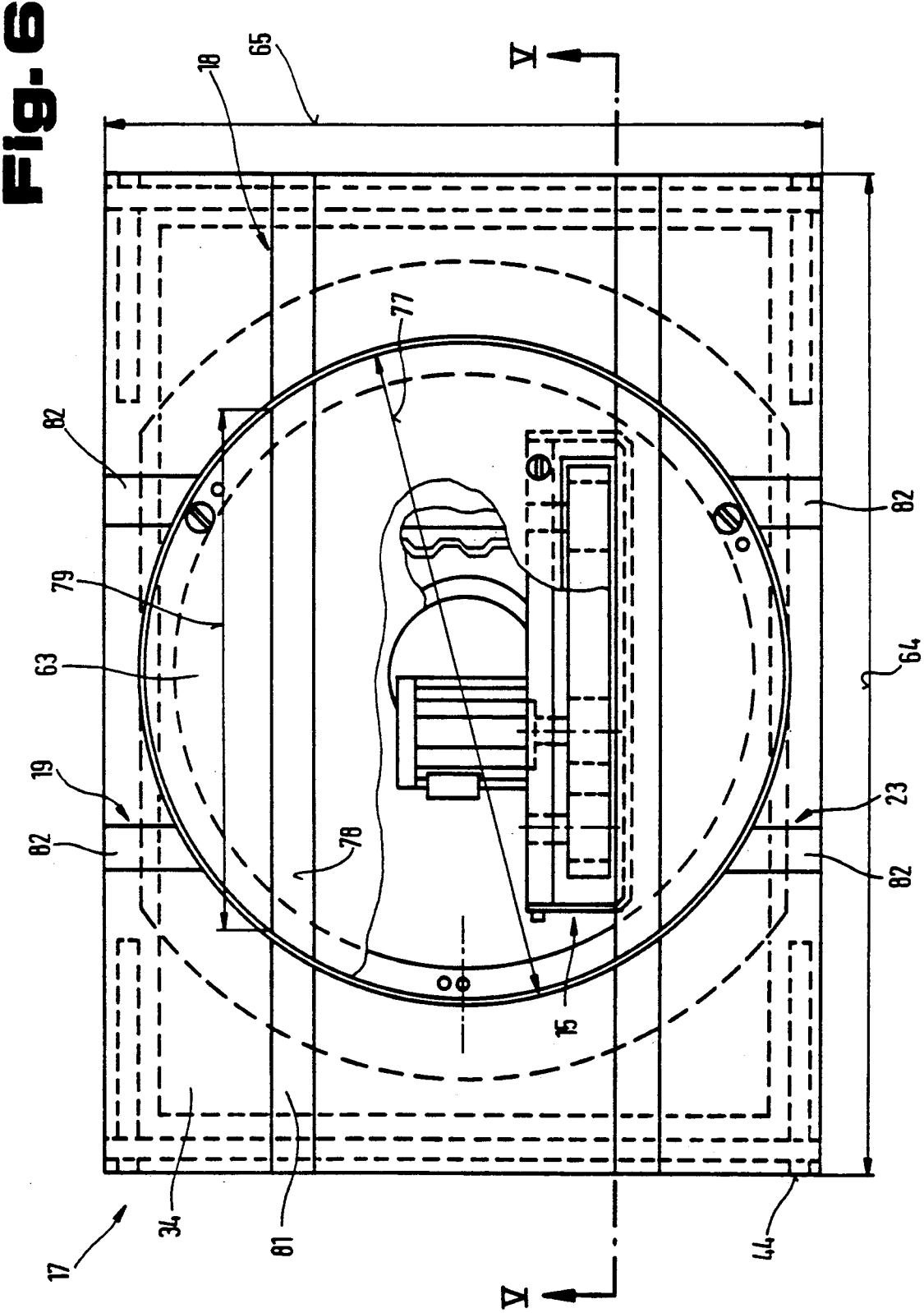
FIG. 6 is a plan view of the track section in FIG. 5, in a simplified diagramatic representation.

FIGS. 5 and 6 show a nodal station 17. This differs from the transport stations 16, in that the forward feed means 15 is arranged not on the table slab 34 but in a turntable 63. Since the housing member 44 of the nodal station 17 has exactly the same external dimensions as the transport station 16, particularly the same length 64 and the same width 65, the same forward feed means 15 may be used both for the transport station 16 and for the nodal stations 17. The same references as in FIGS. 2 to 4 will accordingly be used for identical parts of the forward feed means 15.

The turntable 63, in which the forward feed means 15 is fixed by a supporting plate 38, is arranged on a pot shaped holder 66. The holder 66 is mounted by bearing means 67 in a supporting frame 68 which is connected to or integral with the table slab 34. The table slab 34 contains an aperture 69 of substantially the same dimensions as the diameter of the turntable 63, so that it can receive the turntable 63. The vertical guideway 13 extends between an end face 70 and an end edge 71 on the turntable 34. Similarly vertical guideways 13, which may be formed by hardened or ground guide rails, extend on both sides of the forward feed means 15. The forward feed means 15 is arranged in a recess 72 in the turntable 63, as it already is in the table slab 34. The holder 66 projects beyond the supporting frame 68 in the direction away from the table slab 34, to enable the turntable 63 to move relative to the stable slab 34. A gear wheel 74 is fixed to the projection 73 extending beyond the supporting frame 68, and engages the belt-like drive element 30 of another forward feed means 75. The means 75 may be of the same construction as the means 15 and is fixed either directly to the supporting frame 68 or to a strutting frame 76 joined to the frame 68. By turning the belt-like drive element 30, e.g. the toothed belt 31, the turntable 63 may be displaced through a whole circle, i.e. through 360°, to any angular positions relative to the table slab. The use of the belt-like drive element 30 with its inherent resilient properties gives jolt-free acceleration and deceleration when the turntable 63 is turned relative to the table slab 34.

It will also be seen particularly from FIG. 6 that the width 65 of the housing member 44 is only slightly larger than the diameter 77 of the turntable 63. It is advantageous for the vertical guideway section 78 arranged on the turntable 63, e.g. hardened and ground steel rails and/or high strength plastics parts, to have a length 79 at least slightly greater than the distance 80 between the shafts of the guide rollers 45 of the carriage 10. The carriage and/or the pallet inserts 6 may project beyond the guide rails 45 in one or both directions. It is however advantageous for the length of the pallet insert 6 to be shorter than the length 64 of the housing member 44. This in fact enables a running gear 10 and a pallet insert 6 or a container 5 to be arranged in successive track sections without abutting one another.

This construction advantageously enables the individual housing members 44, with their longitudinal sides immediately adjacent one another and with the minimum distance between track sections, to be arranged transversely to one another's longitudinal direction. The distances travelled by handling equipment straddling the track sections, and/or the manipulating distances for operators in the region of manual work positions, are thereby kept as short as possible. Both time and expenditure in carrying out manipulating and/or assembly processes can thus be saved. In the region of nodal stations 17 however, in which the carriages 10 are brought from a main conveying path 18 into a parallel path 19 or a storage path 23, it should be noted that when the turntable 63 rotates, the carriage 10 and/or pallet insert 6 may project beyond the housing member 44. Accordingly no carriages 2 or pallet inserts 6 or containers 5 should be arranged in the two housing members immediately adjacent housing member 44 in the region of the longitudinal sides thereof.

As a means of connecting the turntable 63 or the vertical guideway sections 78 arranged on it to the parallel conveying path 19 and/or the storage conveying part 23, vertical guideway sections 81 of the main conveying path 18 are associated with vertical guideway sections 82, for example at an angle of 90°.

Figure 7:
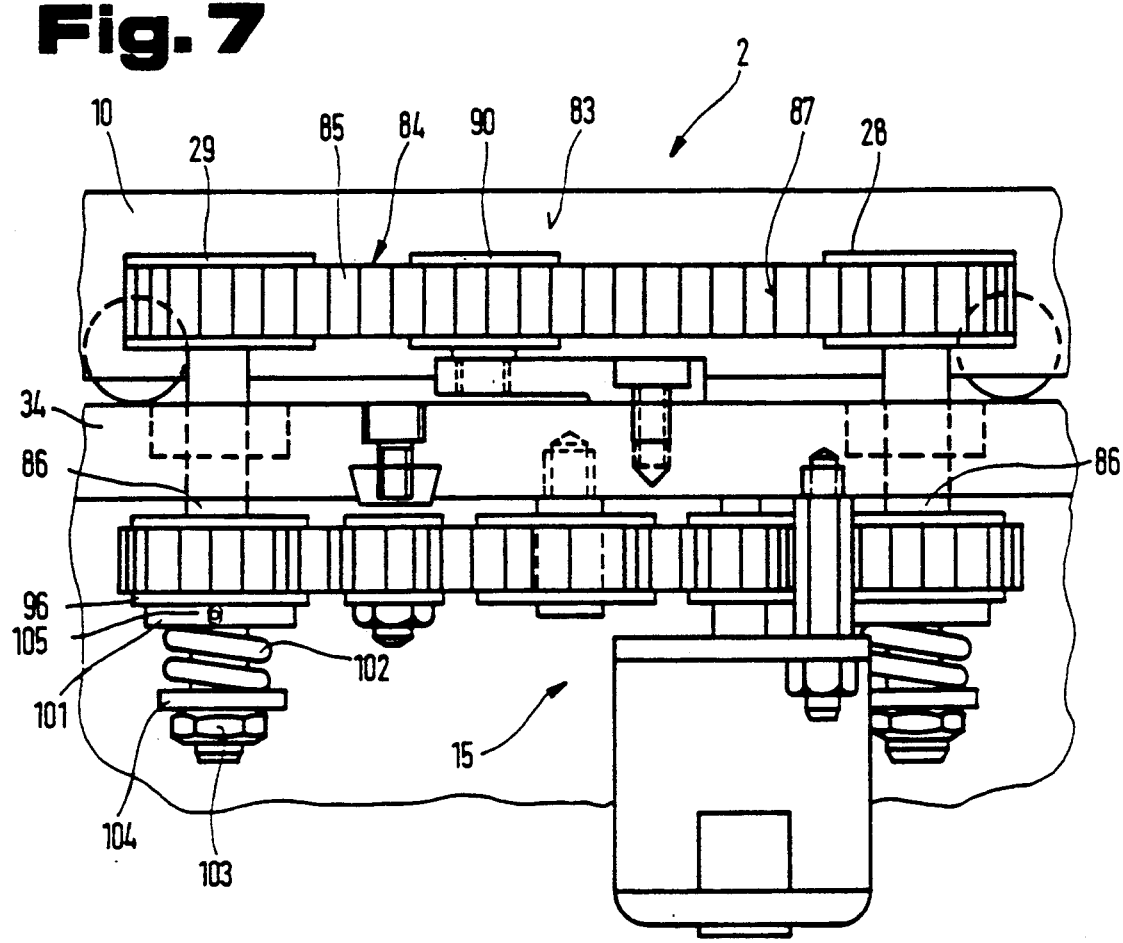
FIG. 7 is a side view, in a section taken along lines VII—VII in FIG. 8, showing a section of track with a forward feed means associated with the sides of the workpiece carrier.
Figure 8:
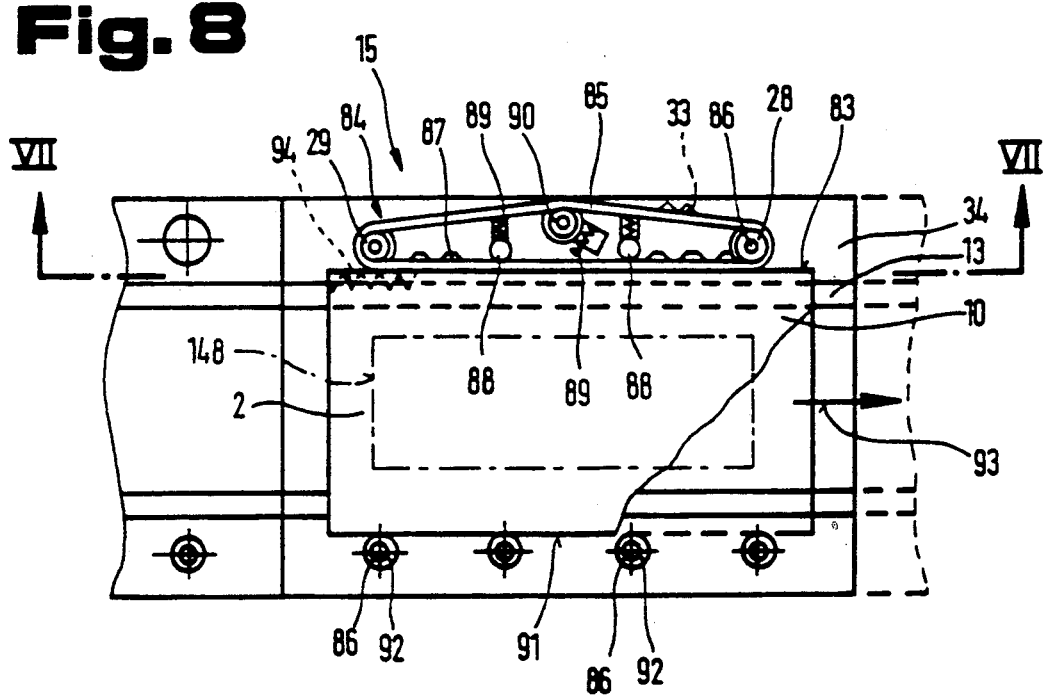
FIG. 8 is a plan view of the track section in FIG. 7, in a simplified diagramatic representation.
Figure 9:
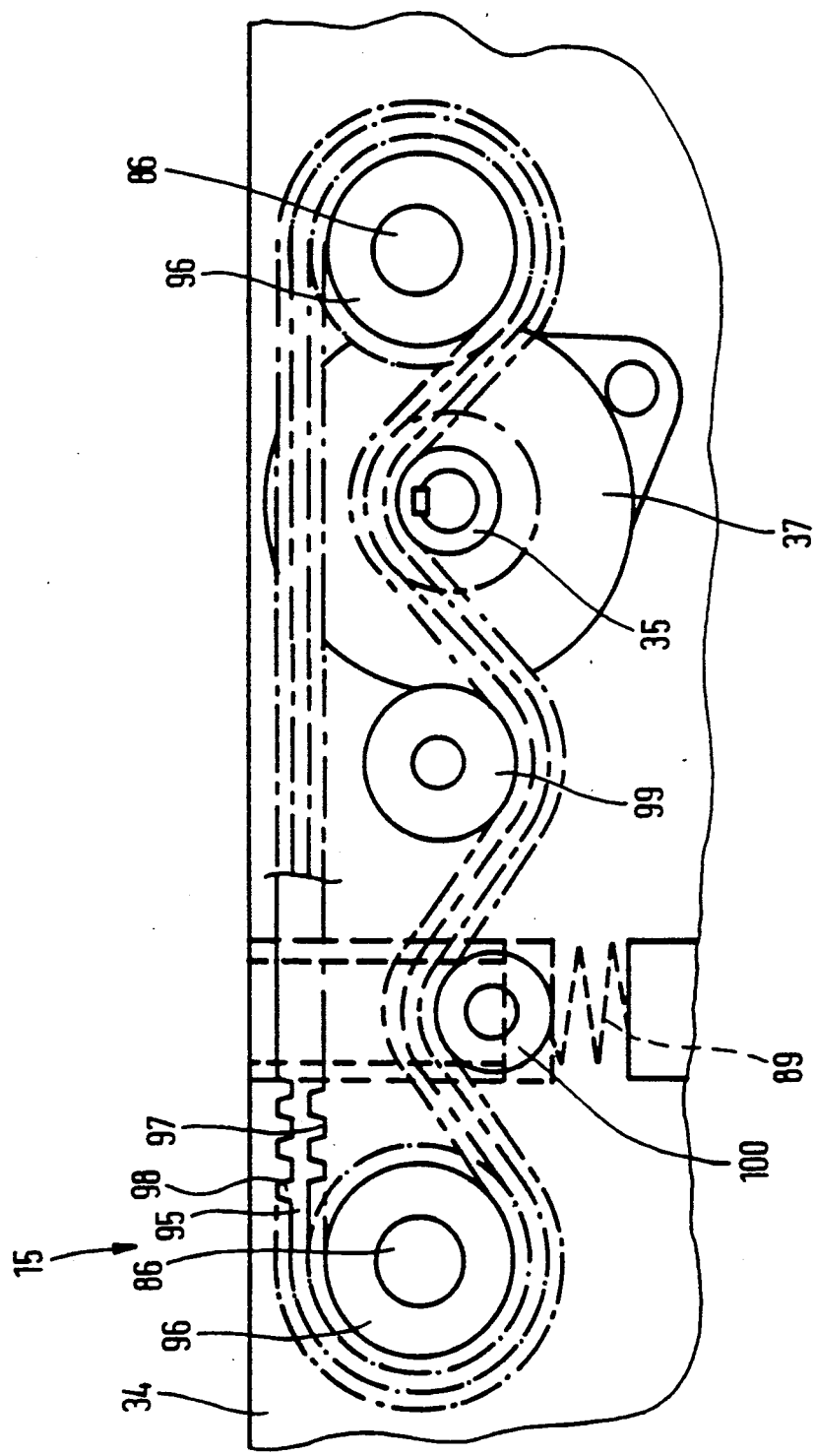
FIG. 9 is a view of the forward feed means in FIGS. 7 and 8 from below, in a simplified diagramatic representation.

FIGS. 7 to 9 show a modified embodiment of a forward feed means 15, where an endless belt-like drive element 84 is associated with the lateral surfaces 83 of a running gear 10. The element 84, for example a toothed belt 85, is located in a plane parallel with a table slab 34, and trained over two direction changing rollers 28, 29 which can rotate about shafts 86 extending normal to the table slab 34. The toothing 87 on the belt 85 is on the side facing towards the pulleys 28, 29. Strutting rollers 88 are provided to give an adequate frictional connection between the lateral surface 83 of the running gear 10 and the belt-like drive element 84, even in the region between the rollers 28, 29. The rollers 88 press the drive element 84 against the lateral surface 83 of the running gear 2, e.g. by the action of a spring 89 with a predefined force. In this way an adequate frictional connection between the drive element 84 and the lateral surface 83 is guaranteed over the whole length of the carriage 2; the running carriage and pallet insert 6 thereon are thereby transported accurately and without any slipping. Of course it is also possible for the pulleys 28, 29 to be resiliently deformable, e.g. in a radial direction, so that they generate a biassing force in the element 84 in the direction of the lateral surfaces 83 of the carriage 2. Another possibility is for the pulleys 28, 29 and the strutting rollers 88 to be arranged on a common supporting plate to be pressed against the lateral surfaces 83 of the carriages 10 by springs 89 or other resilient elements.

To ensure adequate tension in the belt-like drive element 84, a tension roller 90 is further provided between the 28, 29. The tension roller presses outwards, away from the vertical guideways 13, e.g. by the action of a spring 89, thereby compensating for any change in the length of the element 84 resulting from displacement of the strutting rollers 88.

To enable the carriages 10 to be guided without any play and positioned accurately, their lateral surface 91 opposite the lateral surface 83 is supported on lateral guide rollers 92, rotatable on a shaft 86 similarly aligned normal to the table slab 34. In this way the carriages 2 are positioned accurately transversely to the conveying direction—Arrow 93—so the exact location or position of the belt-like drive element 84 cannot unfavourably affect the accuracy with which the carriage 10 is positioned in the various workstations 7 and 8.

In this embodiment it is again possible to provide the belt 85 with toothing 33, as indicated diagramatically by the dash and dot lines in FIG. 8, in addition to the toothing 87 on the opposite side. If the lateral surface 83 of the running gear 2 has diametrically opposed toothing 94, as also indicated with dash and dot lines, such an arrangement will allow for exact positioning of the carriages 10 in the direction of the arrow 93, i.e. the feed direction of the carriage 10, without any slipping.

FIG. 9 further shows the power transmission between the drive motor 37 and drive shafts 86 of the pulleys 28 and 29. The drive shaft of motor 37 is non-rotatably connected to the drive pinion 35, e.g. with a clamp fit with a spring or wedge interposed. A toothed belt 95 is trained over pulleys 96 which are non-rotatably connected to the shafts 86. The pulleys 96 have toothing which interacts with the toothing 97 on the belt 95. Toothing on the outside of the belt 95 meshes with the drive pinion 35 of the motor 37. The pinion 35 is offset from a tangent drawn against the two pulleys 96, in the direction of the opposite run of the belt 95, making the belt 95 loop round the pulley 96 through an angle of over 180°. To obtain adequate looping of the belt 95 round the pinion 35, a pulley 99 is arranged between the two pulleys 96 and substantially brings the belt back into the region of the tangent connecting the two pulleys 96. A tension roller 100 is arranged between the pulley 99 and the pulley 96 further away from the motor 37; it is pressed against the belt 95 by the action compression of a spring 89. It is advantageous for the pulley 99 and the tension roller 100 not to have any toothing, so that the changes in the length of the belt can be compensated for with continuous adjustment and additional distortions or extensions of the belt 95 can be avoided.

It will be seen best from FIG. 7 that the frictional connection between the shaft 86 and the pulleys 96 is provided by friction plates 101, which are pressed against the side of the pulleys 96 by springs 102. A nut 103, screwed onto a threaded part of the shaft 86, positions a supporting plate 104. This predetermines the biassing force of the spring 102 which presses the friction plate 101 against the side of the pulley 96. The friction plate 101 may be non-rotatably connected to the shaft 85, e.g. by a pin 105 extending through it. If the frictional force between the friction plate 101 and the pulley 96 is greater than a blocking force exerted on the lateral surface 83 of the carriage 10 by the applied toothed belt 85, the rotary movement of the belt 95 is transferred to the toothed belt 85.

If a carriage 10 in the region of the belt 85 is held in a pres elected work position, e.g. by a positioning device or stop, then the frictional force between the lateral surface 83 of the running gear 10 and the toothed belt 85 is greater than the frictional force between the friction plate 101 and the pulley 96, and consequently the pulley 96 runs idle. While a carriage 10 is stationary in the region of the forward feed means 15, excessive wear on the belt 85 is consequently prevented. The belt 85 may also have toothing at the side facing the lateral surface 83, since damage to the toothing on the belt 85 or in the surface 83 is prevented by the friction plate 101, acting as a friction clutch, in conjunction with the pulley 96.

Furthermore the exact adjustment to predefined friction values can easily be obtained by adjusting the frictional force between the friction plate 101 and the pulley 96.

At the same time the provision of such a friction clutch between a toothed belt 95 driving the two pulleys 28, 29 and the toothed belt 85 applied to the running gears 10 results in gentle deceleration or acceleration, due to the build up of the frictional force in the friction clutch.

FIGS. 10 and 11 show a carriage 10 moving into the vicinity of a forward feed means 15, as described with reference to FIGS. 2 to 6. It will be seen better from this drawing that the toothing 33 on the belt-like drive element 30 is a kind of pointed toothing, with the tooth profiles 106 substantially converging to a tip. If the toothing 50 on the rack 49, connected for movement with the carriage 10, has relatively fine teeth, a tooth 107, e.g. on the belt 31, can easily be made to engage in a gap 108 between the teeth on the rack 49. This reliably prevents a tooth 109 on the rack 49 from running up onto the tooth 107, with consequent lifting of the carriage 10 off the vertical guideway 13.

It will also be seen from this drawing that a distance 62 between the direction changing rollers 28 and 29 of successive forward feed means 15 is smaller than a distance 80 between the shafts of the guide rollers 45 of the carriage 10. This ensures that at least one forward feed means 15, 75 will be in engagement with the rack 49 of the carriage 10 over the whole conveying path. In the transition region between one forward feed means 15, 75 and another, the carriage 10 is released from the preceding feed means 15, 75 only when it has already been engaged between the teeth 107 on the belt 31 of the succeeding feed means 15, 75. The rollers 60, provided in addition to the pulleys 28, 29, ensure the lateral guidance of the carriages 10 with any pallet insert 6 on it, even in regions where there is no toothed belt 31 or belt-like drive element 30. Consequently a short overlap between the rack 49 and the belt 31 is sufficient; it is only responsible for moving the carriage 10 forwards, since lateral guidance during this stage is provided by the rollers 60. As a simple means of putting the carriages 10 in any desired position along the vertical guideway 13, in the region of a workstation, an sensing member 111 is arranged in front of such a workposition 110, indicated by a dash and dot line. The member 111 interact with a marker 112 on the carriage 10; it is located a predetermined distance 113 in front of the work position 110. If the marker 112 on the running gear 10 passes the sensing member 111, reception of a signal by the member 111 in a control means 114 signifies that the distance 113 still has to be covered to reach the desired work position 110. If the drive motor 37 is a step motor, the distance 113 may be converted to a certain number of rotary steps of the motor 37, and the number of steps through which the motor 37 still has to be turned, may have to be monitored by a setpoint/actual value comparator 115. When the set number of steps has been covered, the drive motor 37 is stopped. This results in relatively accurate positioning of the carriage 10 in the region of work position 110.

The control means 114 may or course interact with a higher level control system or with the control of the preceding forward feed means 15, as indicated diagramatically. If more accurate positioning is required, it is quite possible to use any other measuring device to monitor the distance covered by the carriages 10.

FIG. 11 also shows that the height 116 of the teeth 109 on the rack 49 decreases towards the ends 117 of the carriage 10. For example, the height 116 of teeth 118 to 120 is less than that of teeth 109 on the rack 49. In addition the width 121 of teeth 109 is greater than the width 152 of tooth 118, and teeth 119 and 120 can generally speaking be pointed. The reduced height of teeth 118 to 120, corresponding to an entry angle 123, 124, in conjunction with the shape of the profiles 106 of teeth 107 on the rack 31, can lead to secure, almost jolt free centering of the teeth 107 on the gaps 108 and of teeth 109 and 118 to 120 on gaps 125 in the toothed belt 31. In particular, even if the belt 31 and rack 49 overlap, the pointed shape of teeth 118 to 120 enable the tooth 107 on the belt to be deflected towards the gap 108 as the depth of engagement increases; this is a reliable way of preventing the carriage 10 from being raised or lifted off the vertical guideway 13.

FIGS. 12 and 13 shows a different embodiment of the forward feed means 126, in which a carriage 10 is guided on vertical guideways 13. Rollers 92 arranged between the vertical guideways are used for lateral guidance. A guide surface 127 of the carriage 10 is pressed against these lateral guide rollers 92 by the action of a belt-like drive element 30. The element 30 is pressed at a bias against a rack 49 opposite the guide surface 127. The rack 49 has teeth 50 which are engaged by teeth 33 on the belt-like drive element 30. It will be seen that the drive element is in the plane parallel with the table slab 34, and hence the pulleys 28, 29 are in a horizontal plane just as the lateral guide rollers 92.

In this embodiment the belt-like drive member 30, e.g. a toothed belt 31, can be driven directly by a drive pinion 35 of a drive motor 37. For this purpose the belt may also have toothing 32 on the inside, providing a slip-free drive between the motor 37 and the carriages 10 or a pallet insert 6 thereon.

The carriages 10 are guided vertically on the vertical guideways 13 by means of guide rollers 45, which are also recessed into the running gears 10.

Of course it is also possible to use an appropriate supporting rails instead of the lateral guide rollers 92; alternatively the pulleys 28, 29 and the supporting rollers 88 may have guide plates above them, against which a guide surface 127 of the carriage 10 can be supported.

FIG. 14 shows a housing member 44 of a processing or workstation 7, 8 in a manufacturing installation 1. The housing member 44 comprises an upper and a lower base frame 128, 129, held apart by columns 130. The two frames 128, 129 are rectangular, and the upper 128 has segmental recesses 131. As explained in connection with FIG. 6, the length 64 of the member 44 is greater than its width 65. The same applies to the base frames 128 and 129. They may be interconnected by a screw means of welds or constructed integrally. Each frame has guide surfaces 134, 135 in the region of the longitudinal side walls 132, 133 and guide surfaces 134 and 138. Fixing rails 139, illustrated as T-shaped grooves, extend along the entire length of guide surfaces 134 and 138 while in the region of the side walls 136, 137. Guide surfaces 135 have only fixing rails sections 140 extending from the side walls 136, 137 into the region of the recesses 131. This is done to avoid further weakening the upper base frame 128 which already has the recesses 131. The recesses 131 are not essential, but they provide an advantageous opportunity of keeping the width 65 of the base frames 128, 129 and housing member 44 small enough for two rows of housing members 44 with their longitudinal walls immediately adjacent, to be located in the working region of an operator.

With this construction it is also possible to obtain a maximum distance 80 between the shafts of the carriages 10, thus enabling the running gear 10 to have a rectangular construction parallel with the direction in which they move. This additionally improves the allocation and orientation of the carriages and also the accuracy with which they are guided in a vertical and a lateral direction.

The other advantage of having a housing member 44 designed as in FIG. 14 is that it can now be used both for the transport stations 16 and the nodal stations 17, and these different stations can be made simply by using different table slabs 34 or turntables 63 inserted in the table slab 34, as was explained in connection with FIGS. 2 to 4 and 5 to 6. This surprisingly simple construction of the housing members 44, depending on the construction of the table slab 34, make it possible to use a wide variety of forward feed means 15, 126, according to whether the workstation in question is a manual one, where the manipulating and assembly processes are carried out by an operator, or a station where they take place automatically.

The guide surfaces 134, 135 and 138, which project from the surfaces of the columns 130 and can be machined more precisely, enable the individual housing members 44 to be interconnected with accurate dimensioning to form continuous carriageways. At the same time the guide surfaces 134, 135 and 138 may be used in conjunction with the fixing rails 139 and fixing rail sections 140, to position and fix manipulating and/or feed means such as conveying accessories and the like to the housing members 44. This dispenses with expensive supporting structures and centering devices to align those parts on the conveying track.

The individual housing members 44 may be interconnected by fitting holes 141 and fitting pins 142, as indicated diagramatically. If the holes 141 are made on the same lathe as the machining of the guide surfaces 138, 134 and 135, the housing members 44 can be interchanged at will and therefore coupled together in any sequence.

As will further be seen from the drawings, particularly FIGS. 3, 4 and 5, recesses 146 and apertures 147—FIG. 4 and FIG. 5—may be provided in the table slabs 34 parallel with the vertical guideways 13, which may be formed by hardened and ground steel guide rails 143—FIG. 4. The aperture 147 in FIG. 5 is in the turntable 63. As shown particularly in FIGS. 3 and 6, the apertures 147 are generally located off centre, usually directly adjacent one of the vertical guideways 13. In this way an opening 148, indicated in dash and dot lines by way of example, may be provided in the region of the transport stations 16 in addition to the forward feed means 15. Tools and/or supporting plungers may be passed through the opening from below to engage the carriage 10 or 2. In stations, for example, where strong compressive forces have to be applied, e.g. for caulking, embossing or the like, this enables the carriage 2 or 10 to be supported directly on the bed by a vertically adjustable plunger, and consequently the compressive forces which arise in such processes do not have to be absorbed by the housing members 44 alone.

Figure 15:
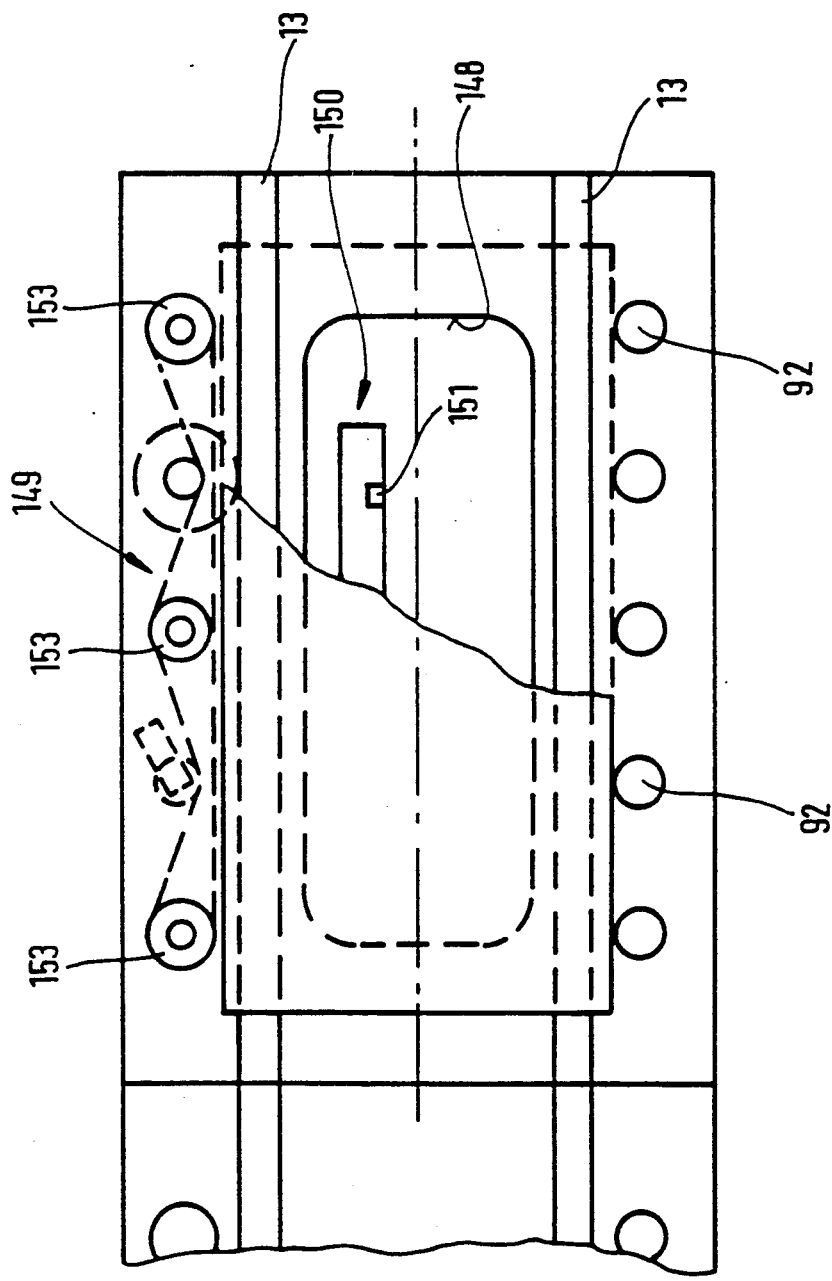
FIG. 15 is a plan view of a housing member with a forward feed means of different construction.

FIGS. 8 and 15 show a forward feed means 15; 149 arranged laterally outside the vertical guideway 13. In this case the opening 148 may be larger than in the FIG. 3 arrangement of a feed means 15; a psitioning means 150 for engaging and positioning the carriages 2 may be arranged in the opening 148. The positioning means may be designed in accordance with U.S. Pat. No. 4,687,091. Stops 151 on the means 150 catch the opposing stops 152—FIG. 5—on the carriages 10 in any required position.

The feed means 149 in FIG. 15, may for example, have a plurality of drive rollers 153 which are resilient in a radial direction and spaced one behind the other along the vertical guideway 13. The rollers 153 press the carriages 10 or 2 against the lateral guide rollers, arranged at the opposite side of the guideway 13, without any play. Thus the running gears 10 or 2 may be guided along the rollers 92 without any play. The drive rollers 153 and lateral guide rollers 92, and the carriages 10 and 2 may be constructed e.g. as described in U.S. Pat. No. 4,530,287.

The drive rollers 153 may be driven as shown in the FIG. 9 drive diagram, in which case an additional pulley 96 may be provided for the central drive roller 153 instead of the direction changing roller 99.

FIG. 16 shows how a manufacturing installation 1 can be formed from the housing members 44 according to the invention, including transport and nodal stations 155 and 156. Thus a continuous main conveying path 154 comprises a plurality of transport stations 155, with their side walls 136 and 137 adjoining without a seam, corresponding in construction to the transport stations 16. Two nodal stations 156 are arranged along this main conveying path 154, each adjoined by a transverse conveying path 157. The transverse conveying path 157 is made up of nodal stations 156, 158, with their longitudinal side walls 132 and 133 parallel with one another and parallel with those of the stations 156, and a transport station 155 with its side walls 136, 137 parallel with the walls 132, 133 of the nodal stations 156, 158. The provision of the nodal stations 156, 158 enables a parallel conveying path 159 and an adjacent conveying path 160 to be directly juxtaposed so that the longitudinal side walls 132 and 133 of the transport station, 155 are directly adjacent or in contact with one another. A storage conveying path 161 is additionally formed between the nodal stations 158.

Carriage 10 are conveyed along the main path 154, transverse paths 157 and parallel paths 159, with pallet inserts 6 placed thereon. Along the adjacent conveying path 160 there are containers 5 on running gears 10; they are designed as grab containers 162 for use in the region of manual work positions. Thus an operator 163 (indicated diagramatically) can join individual parts 4 stored in the grab containers 162, e.g. by means of individual parts 4 conveyed on the pallet inserts 6, or parts provided ready on a carriage 164, thus forming subassemblies. In addition he may position individual parts on the pallet inserts 6 for the premounted subassemblies, which can be mounted or processed at a lager stage, e.g. in the region of work station 8, i.e. the automatic module.

Use of the containers 5, placed on the carriages 10 and designed as grab containers 162 enables the appropriate parts to be made available for the jobs to be done by the operator 163. Thus it is possible, inter alia, with components which have to be mounted in small batches, to pass through a certain number of carriages 10 with pallet inserts 6, they to convey the grab containers on their carriages 10 fully automatically into the storage conveying path 161 and to deposit them there, replacing those which have already been held in stock in the storage path for later use. On the other hand it is also possible to advance the grad containers 162 along the main conveying path 154, simultaneously with the carriages 10 and pallet inserts 6, which may if appropriate be provided with mounting seats for the components to be mounted or exclusively with such mounting seats. In this case the carriages 10 carrying the pallet inserts 6 with mounting seats or with component seats would be brought into the region of the parallel conveying path 159, and the carriages 10 with the grap containers 162 into the region of the adjacent conveying path 160.

To obtain adequate safety from industrial accidents, it is also possible to provide a mobile partition wall 165 between the parallel conveying path 159 and the adjacent conveying path 160. The wall 165 may e.g. be moved from a region beside the transverse path 157 between the parallel path 159 and the adjacent path 160, along a guide rail 166 above the conveying paths. It is also possible for the wall 165 to be raised from below the housing members 44. Once it has been raised, the carriages 10 with the grab containers 162 can be transported as desired without any danger of injury to the operator 163.

It will be seen from FIG. 16 that the grab containers have openings 167, so that they can also be used as wash basins. Thus the components 4 provided for assembly can be cleaned and washed before assembly, as is done e.g. with components for vehicle brakes. Residues of solvent or lubricant from previous mechanical processing can be moved in the washing process.

It is naturally also possible to provide the carriages 10 and/or grab containers 162 with coding elements 168 which can be read by means of coding devices 169, even with a possibility of changing the information contained on the devices 169 if appropriate. In this way one can establish whether the components 4 in the grab containers 162 are suitable for the product to be assembled or if the correct components have been placed therein ready for assembly, in accordance with the set assembly program stipulated, e.g. by a master computer. If this is not the case, the carriages 10 carrying those containers 162 will not be stopped. The carriages will continue to travel along the adjacent path 160 to the transverse path 157, until those carrying the grab containers 162 with the correct components are detected by the coding device 169.

It should be pointed out that, if manual manipulations or assembly processes are carried out in the parallel path 159, the forward feed means 15 in the path 159 will be actuated by the operator, e.g. by means of a pedal, independently of the control device or master computer. Thus there can never be more than one carriage 10, carrying a pallet insert 6 with assembly seats or component seats, in the work region. Injuries to the operator resulting from squeezing can be prevented by using a two-hand operating system.

I claim:

1. An installation for processing or assembling components, which comprises a succession of transport and work stations, each station comprising a housing member including a lower base frame and an upper base frame, at least one of the housing members supporting a straight conveying track for a workpiece carrier carrying the components and at least one of the housing members supporting intersecting conveying tracks for the workpiece carrier, the conveying tracks including vertical and lateral guide means for the workpiece carrier, the housing members having the same dimensions in length and width, and the width of each housing member being shorter than the length, the housing member base frames having vertical side walls extending along the length and the width, a continuous fixing rail extending along the vertical side walls of the lower base frame, fixing rails extending along the entire length of the vertical side walls of the upper base frame extending along the width, and fixing rail sections extending towards each other along about a third of the length of the vertical side walls of the upper base frame extending along the length, and a forward feed means for conveying the workpiece carrier along the conveying tracks.

2. The installation of claim 1, wherein the housing member base frames are rectangular frames having four corners, and the housing member comprising columns extending perpendicularly to the base frames and connecting the base frames.

3. The installation of claim 2, wherein the housing member further comprises a table plate mounted on the upper base frame, the table plate defining a recess receiving the forward feed means.

4. The installation of claim 3, further comprising a supporting plate affixed to the table plate, the forward feed means being mounted on the supporting plate and comprising a belt-like drive element projecting a predetermined distance above the table plate.

5. The installation of claim 4, wherein belt-like drive element is an endless toothed belt.

6. The installation of claim 4, further comprising lateral guide rollers for the workpiece carrier, the guide rollers being aligned with the drive element and supporting the drive element, and additional lateral guide elements spaced from respective ends thereof, the guide rollers and guide elements being rotatable about an axis extending parallel to the table plate and being level therewith.

7. The installation of claim 1, wherein the vertical guide means comprises hardened and ground steel guide rails.

8. The installation of claim 1, wherein a plurality of said housing members are arranged adjacent each other in a row, the vertical side walls abutting each other and the straight conveying tracks being arranged to form a continuous conveying path for the workpiece carrier.

9. The installation of claim 8, comprising two parallel rows of said housing members, the vertical side walls extending in the width abutting each other in each row and the vertical side walls extending in the length of the housing members in each row abutting the vertical side walls extending in the length of the housing members in the parallel row.

10. The installation of claim 1, wherein the housing member is of cast iron.

11. An installation for processing or assembling components, which comprises a succession of transport and work stations, each station comprising a housing member including a lower base frame, an upper base frame and a table plate mounted on the upper base member, at least one of the housing members supporting a straight conveying track for a workpiece carrier carrying the components and at least one of the housing members supporting intersecting conveying tracks for the workpiece carrier, the conveying tracks including vertical and lateral guide means for the workpiece carrier, the housing members having the same dimensions in length and width, and the width of each housing member being shorter than the length, a forward feed means for conveying the workpiece carrier along the conveying tracks, the table plate defining a circular recess receiving the forward feed means, a supporting frame received in the circular recess and extending downwardly from the table plate into the housing member, a turntable whereon the forward feed means is mounted, and a holder supporting the turntable on the supporting frame and rotatable about an axis extending perpendicularly to the table plate, the turntable defining an elongated recess, and the forward feed means comprising an endless belt-like drive element having an upper course and a lower course, the upper course of the drive element projecting through the elongated recess in the turntable and the circular recess in the table plate above the table plate.

12. The installation of claim 11, wherein the vertical guide means extend parallel to the elongated recess in the turntable, and further comprising equidistantly spaced vertical guide elements extending at different angles transversely to the straight conveying track.

13. The installation of claim 12, wherein the base frame members have vertical side walls extending in the length and in the width, the table plate has an edge facing the turntable in the circular table plate recess, and the vertical guide elements extend parallel, and perpendicularly to, the vertical side walls extending in the length between the turntable and the vertical side walls.

14. The installation of claim 11, wherein a ring gear extending parallel to the turntable is mounted on an end of the holder remote from the turntable, and further comprising a drive element engaging the ring gear and extending perpendicularly to the forward feed means.

15. The installation of claim 14, further comprising a bearing means supporting the holder on the support frame, the holder having a part remote from the turntable and projecting beyond the supporting frame, and the ring gear is mounted on the projecting holder part.

16. The installation of claim 11, wherein the housing member, the supporting frame and the holder are of cast iron.

* * * * *